United States Patent
Torii et al.

[11] Patent Number: 5,085,619
[45] Date of Patent: Feb. 4, 1992

[54] DUAL PINION ANTI-BACKLASH TENSIONER FOR A ROBOT

[75] Inventors: Nobutoshi Torii, Hachioji; Susumu Ito; Akihiro Terada, both of Yamanashi, all of Japan

[73] Assignee: Fanuc Ltd, Yamanashi, Japan

[21] Appl. No.: 602,226

[22] PCT Filed: Feb. 27, 1990

[86] PCT No.: PCT/JP90/00238
§ 371 Date: Oct. 30, 1990
§ 102(e) Date: Oct. 30, 1990

[87] PCT Pub. No.: WO90/09872
PCT Pub. Date: Sep. 7, 1990

[30] Foreign Application Priority Data
Mar. 2, 1989 [JP] Japan .................................. 1-48474

[51] Int. Cl.$^5$ ............................................... F16H 7/12
[52] U.S. Cl. ....................................... 474/138; 74/409
[58] Field of Search ............... 474/135, 138, 139, 900; 74/409, 440

[56] References Cited

U.S. PATENT DOCUMENTS

| | | | |
|---|---|---|---|
| 2,895,342 | 7/1959 | Hayhurst | 74/409 |
| 3,166,952 | 1/1965 | Lang | 74/409 X |
| 3,310,998 | 3/1967 | Harmening | 74/409 X |
| 3,359,819 | 12/1967 | Veillette et al. | 74/409 |
| 3,397,590 | 8/1968 | Prentice | 74/409 |
| 3,545,296 | 12/1970 | Eggins | 74/409 X |
| 3,665,482 | 5/1972 | Cresswell | 74/409 X |
| 4,637,773 | 1/1987 | Nakashima et al. | 74/89.2 X |
| 4,714,388 | 12/1987 | Silev | 74/409 X |

FOREIGN PATENT DOCUMENTS

63-23064 1/1988 Japan .

*Primary Examiner*—Ramon S. Britts
*Assistant Examiner*—Roger J. Schoeppel
*Attorney, Agent, or Firm*—Armstrong, Nikaido, Marmelstein, Kubovcik and Murray

[57] ABSTRACT

A joint structure for an industrial robot is provided with a gear transmission mechanism to drive movable robot element, such as a swivel body (14), of an industrial robot. The joint structure comprises a driven gear (26) connected to the movable robot element, two drive pinions (28, 30) in mesh with the driven gear (26), respectively, at different positions on the driven gear (26), a belt transmission mechanism (28a, 30a, 32) operatively connecting the two drive pinions (28, 20), a tensioner (36) for adjusting the tension in the power transmission belt (32) of the belt transmission mechanism (28a, 30a, 32), and a rotative drive source (34) connected to one (28) of the two drive pinions (28, 30). The position of the tensioner (36) is adjusted to adjust the tension in the power transmission belt (32), to thereby eliminate backlash between the respective meshing teeth of the two drive pinions (28, 30) and the driven gear (26), by pressing the respective teeth of the drive pinions (28, 30) against the corresponding teeth of the driven gear (26), respectively, in opposite directions.

3 Claims, 2 Drawing Sheets

DUAL PINION ANTI-BACKLASH TENSIONER FOR A ROBOT

TECHNICAL FIELD

The present invention relates to a joint or articulation structure for an industrial robot, and more particularly, to an improved joint structure for an industrial robot having movable robot elements driven through gear transmission mechanisms.

BACKGROUND ART

The industrial robot has an assembly of a plurality of movable robot elements which are articulated in functional sequence by joint structures. The joint structures are operated to provide the motions of the movable robot elements, and thus enable an end effector provided on the extremity of the robot unit to achieve the desired robot motions. Generally, a joint structure is provided in the base unit of a robot assembly, to turn movable elements provided on the extremity of the robot body or the vertical shaft, including a robot arm, a robot wrist and an end effector, about a vertical axis by turning the robot body or the upright shaft, and usually, the joint structure provided in the base unit is provided with a gear transmission mechanism or a reduction gear. When the joint structure is provided with a gear transmission mechanism, however, the working accuracy of the end effector provided on the extremity of the robot assembly is directly affected by the transmission accuracy of the gears of the gear transmission mechanism. For example, a backlash always remains between the teeth of the mating gears of the gear transmission mechanism, and accordingly, an uncontrollable zone appears in the motion of the movable robot element driven through the gear transmission mechanism by a drive source when the gears of the gear transmission mechanism are reversed, and thus precise robot motions cannot be obtained. The applicant of the present patent application previously proposed a backlash eliminator for a reduction gear applicable to the joint structure of the base unit of a robot assembly, in Japanese Unexamined (Kokai) Patent Publication No. 63-23064, to solve the problems attributable to this backlash. This previously proposed backlash eliminator comprises two pulleys provided one above the other on the output end of a drive motor and able to turn relative to each other, a first pinion engaging a driven gear and driven through a transmission belt (toothed belt) by one of the pulleys, and second pinion engaging the same driven gear and driven through a transmission belt by the other pulley whereby backlash is eliminated by the relative rotation of the two pulleys.

A gear transmission mechanism or a reduction gear mechanism incorporating such a backlash eliminator has two power transmission routes, due to the employment of the two pulleys, and the power transmission belts are usually properly tensioned by tension devices, to secure a precise power transmission. Therefore, when the power transmission belts are improperly tensioned, or the power transmission belts are not periodically changed, the power transmission belts are readily broken; particularly when the backlash eliminator is included in the power transmission system of an industrial robot, in which the power transmission system is required to transmit a comparatively large power. If one of the two transmission belts is broken the load on the other transmission belt is sharply increased, and the other transmission belt, which also has been worn to a significant extent by that time, may break shortly after the former transmission belt is broken. Accordingly, since the drive side of the power transmission system and the driven gear are interlocked only by the two transmission belts, the movable robot elements operatively connected to the driven gear may become free and uncontrollable when the transmission belts are broken.

DISCLOSURE OF THE INVENTION

Accordingly, an object of the present invention is to provide a robot joint or articulation structure capable of solving the problems encountered by the conventional joint structure for an industrial robot provided with such a known gear transmission mechanism.

Another object of the present invention is to provide a joint or articulation structure for an industrial robot provided with a gear transmission mechanism and capable of continuously securing the mechanical connection of the driven gear and a rotative drive source of the gear transmission mechanism, to prevent uncontrolled free motions of the movable robot elements.

A further object of the present invention is to provide a joint or articulation structure for an industrial robot provided with a gear transmission mechanism and capable of achieving an effective backlash elimination.

In view of the foregoing objects, a joint structure for an industrial robot provided with a gear transmission mechanism in accordance with the present invention incorporates a mechanism capable of continuously securing the connection of a driven gear and a rotative drive source of the gear transmission mechanism, and eliminates backlash by the engagement of two pinions and a driven gear.

The present invention provides a joint structure to be incorporated into an industrial robot, to drive movable robot elements of the industrial robot through a gear transmission mechanism, comprising: a driven gear connected to a movable robot element of the industrial robot; two drive pinions engaging the driven gear respectively at different positions; a belt transmission mechanism operatively interconnecting the two drive pinions; a tensioner for exerting an adjustable tension to the belt of the belt transmission mechanism, to eliminate backlash by causing the respective teeth of the two pinions to be engaged with and pressed against the teeth of the driven gear, respectively, in opposite directions, by the belt transmission mechanism, and a rotative drive source connected to one of the two drive pinions.

Since the respective teeth of the two pinions are pressed against the teeth of the driven gear, respectively, in opposite directions, backlash is eliminated, the rotation of the drive side can be transmitted to the driven side without backlash, for a precise power transmission when the rotating direction of the driving side is reversed, and thus precise robot motions are obtained. Since one of the pinions always secures the connection of the rotative drive source and the driven gear, the driven gear cannot make uncontrolled free motions even if the transmission belt of the belt transmission mechanism is broken.

BRIEF DESCRIPTION OF THE DRAWINGS

The above and other objects, features and advantages of the present invention will become more apparent from the following description taken in connection with the accompanying drawings, in which.

BEST MODE OF CARRYING OUT THE INVENTION

Figure 3:
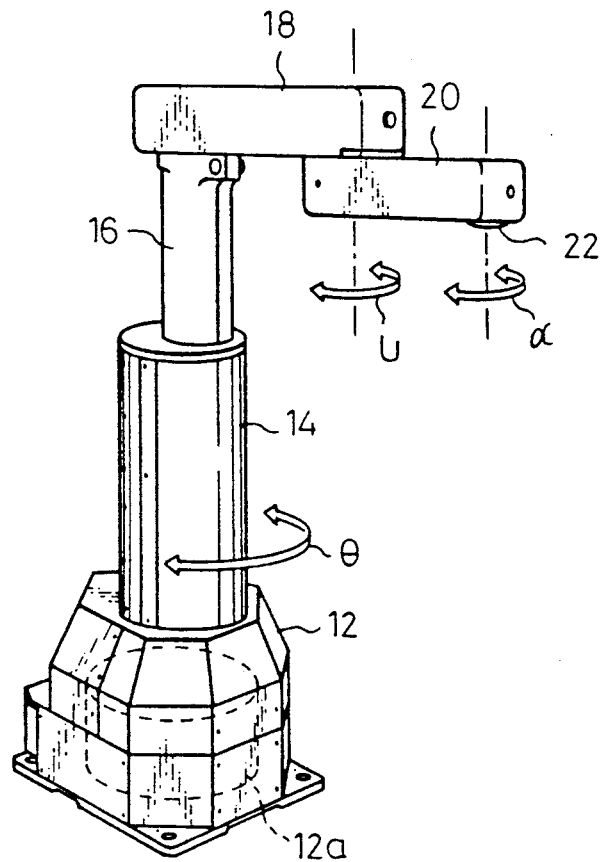
FIG. 3 is a view showing the appearance of an industrial robot incorporating a joint structure in accordance with the present invention.

Referring first to FIG. 3, which shows a horizontal articulated industrial robot incorporating a joint structure in a preferred embodiment according to the present invention and provided with a gear transmission mechanism, the robot assembly has a robot base 12 as the bottom element, and a swivel robot body 14 mounted on the robot base 12 for swiveling motion about a vertical axis ($\theta$-axis). The swivel body 14 is supported in a joint structure 12a incorporating the constitution of the present invention and provided inside the robot base 12. A vertically movable vertical shaft 16 is supported on the swivel body 14, a first horizontal robot arm 18 is articulated to the upper end of the vertical shaft 16, and a second horizontal robot arm 20 is articulated, for a swing motion about a vertical axis (U-axis), to the extremity of the first horizontal robot arm 18. A robot wrist 22 is provided on the extremity of the second horizontal robot arm 20, and an end effector, such as a robot hand, not shown, is held by the robot wrist 22 for turning motions about a vertical axis ($\alpha$-axis) parallel to the U-axis. The swiveling accuracy of the swivel body 14 directly affects the accuracy of swing motions of the first horizontal robot arm 18 and the second horizontal robot arm 20 in a three-dimensional space, and thus the joint structure 12a provided in the robot base 12 must be precisely swiveled.

The basic construction of a joint structure provided with a gear transmission mechanism in accordance with the present invention and applicable to the joint structure provided in the robot base 12 to swivel the swivel body 14, will be described hereinafter with reference to FIGS. 1 and 2.

Figure 1:
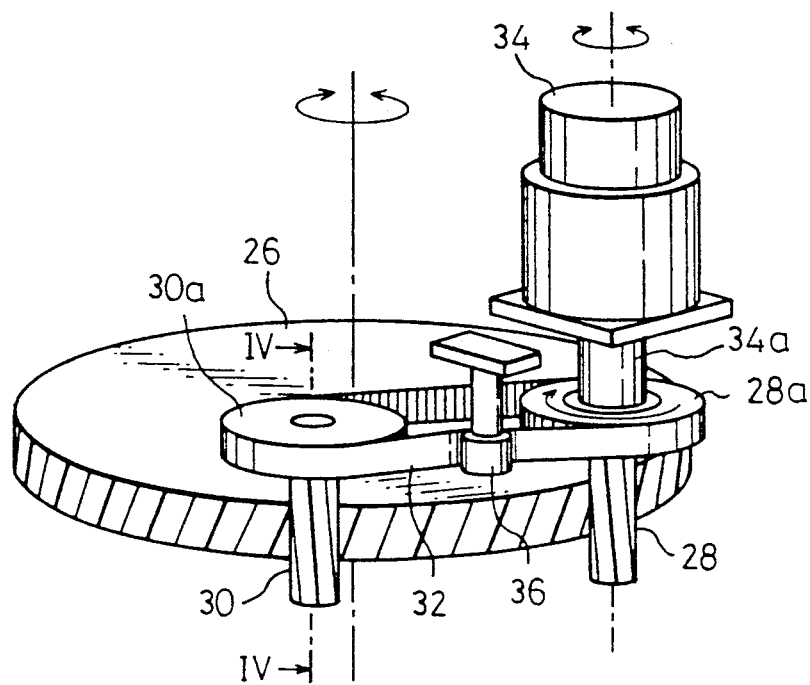
FIG. 1 is a perspective view of an essential portion of a robot joint structure embodying the present invention provided with a gear transmission mechanism.
Figure 2:
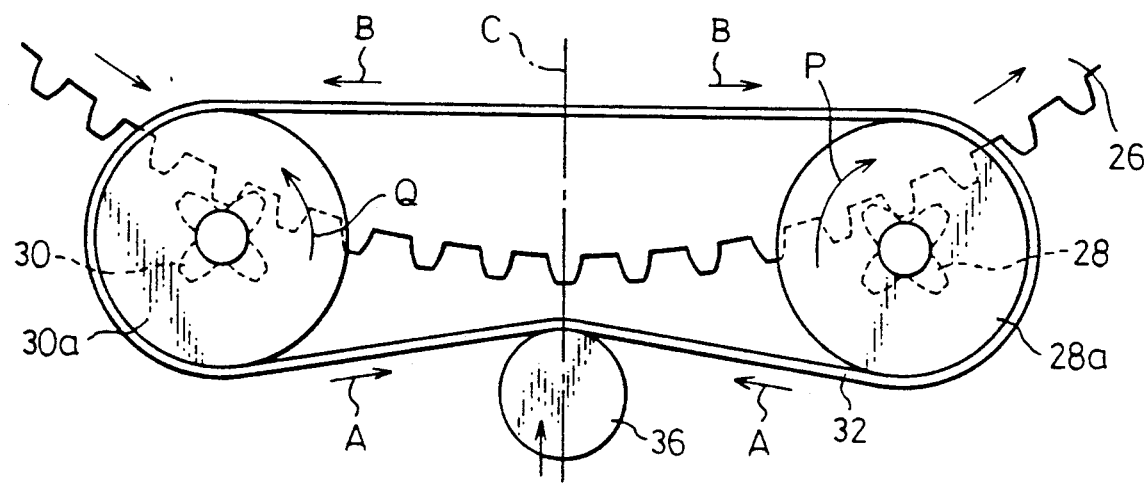
FIG. 2 is an enlarged plan view of assistance in explaining a principle of backlash elimination, showing a portion of the robot joint structure of FIG. 1.

Referring to FIGS. 1 and 2, the joint structure comprises a driven gear 26, two drive pinions 28 and 30 engaging the driven gear 26, respectively, at different positions, timing belt pulleys 28a and 30a coaxially combined respectively with the drive pinions 28 and 30, a generally known timing belt 32 extended between the timing belt pulleys 28a and 30a, a servomotor 34 that delivers a rotative driving force, having an output shaft 34a to which the drive pinion 28 and the timing belt pulley 28a are fixed, and a tensioner 36 pressed against the timing belt 32, for adjusting the tension in the timing belt 32. The tensioner 36 is movable toward and away from the run of the timing belt 32, in a narrow range, for adjusting the tension in the timing belt 32, and the tensioner 36 has, for example, a flange 36a slidable relative to a tensioner holding member, not shown, for tension adjustment.

The two drive pinions 28 and 30 and the driven gear 26 are the components of a gear transmission (reduction) mechanism, which will be described afterward. The pair of timing belt pulleys 28a and 30a, and the timing belt 32 are the compounds of a belt transmission mechanism, and the two transmission mechanisms are provided to construct a joint structure for interlocking two movable robot elements. The center shaft of the driven gear 26 is connected to a movable robot element, such as a robot body or a rotary shaft, not shown in FIG. 1, and the servomotor 34 is secured, for example, to the robot base 12 at an appropriate position. The driven gear 26 is rotated by the rotative drive force of the servomotor 34 transmitted thereto through the pinion 28 or 30 at a reduction ratio, i.e., the ratio of the number of teeth of the driven gear 26 to that of the pinion 28 or 30, to rotate the movable robot element. The servomotor 34 drives the drive pinion 28 and the timing belt pulley 28a directly for rotation, the drive pinion 28 transmits the rotative drive force of the servomotor 34 to the driven gear 26, and the timing belt pulley 28a transmits the rotative drive force of the servomotor 34 through the timing belt 32 properly tensioned by the tensioner 36, the timing belt pulley 30a, and the drive pinion 30 to the driven gear 26. The joint structure is thus constructed to rotate two movable robot elements relative to each other.

An operational principle of the joint structure thus constructed to eliminate backlash will be described with reference to FIG. 3.

Figure 4:
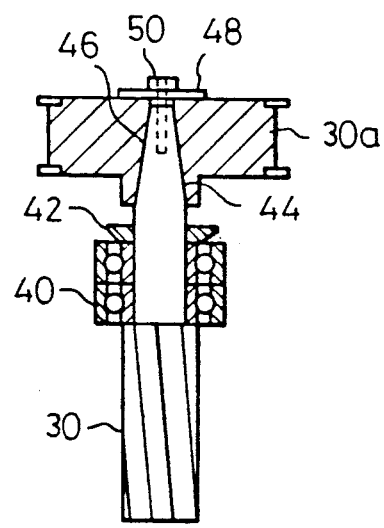
FIG. 4 is a sectional view taken along the line IV—IV in FIG. 1.

When constructing a gear transmission mechanism by mating the drive pinions 28 and 30 with the driven gear 26 having the same tooth dimensions as those of the drive pinions 28 and 30 at two positions on the driven gear 26, the pinions 28 and 30 are engaged with the driven gear 26 and each has backlash between the meshing teeth. In this initial state, a precise rotation transmission system is not completed because backlash between the meshing teeth of the pinions 28 and 30 and the driven gear 26 exists. Then, the timing belt 32 is extended between the timing belt pulleys 28a and 30a combined respectively with the drive pinions 28 and 30, to construct a belt transmission mechanism for transmitting the rotation of the side of the drive pinion 28 to the side of the drive pinion 30. When the endless timing belt 32 is extended between the timing belt pulleys 28a and 30a, the pinions 28 and 30 must be phased with respect to the driven gear 26. That is, since the transmission system forms a power transmission loop of the pinion 28→the driven gear 26→the pinion 30→the timing belt pulley 30a→the timing belt 32→the timing belt pulley 28a→the pinion 28, the drive pinions 28 and 30, and the timing belt pulleys 28a and 30a must be phased. In this embodiment, as shown in FIG. 4, the free end, i.e., the upper end in FIG. 4, of the shaft 44 of the drive pinion 30, supported in bearings 40 having inner races fastened to the shaft 44 with a nut 42, is tapered to form a tapered portion 46, and a tapered bore is formed in the timing belt pulley 30a for a firm connection of the shaft 44 and the timing belt pulley 30a. When phasing the drive pinion 30 and the timing belt pulley 30a, a stop bolt 50 and a washer 48 are unfastened, the angular position of the timing belt pulley 30a relative to the drive pinion 30 is properly adjusted, and then the stop bolt 50 is tightened to fasten the timing belt pulley 30a firmly to the tapered portion 46 of the shaft 44.

After thus completing the phase adjustment, the pressure applied to one of the runs of the timing belt 32 by the tension adjusting tensioner 36 is increased, to increase the tension in the timing belt 32, and consequently, sections of the run of the timing belt 32 on the opposite sides of the tensioner 36 are pulled toward the contact point of the tensioner 36 and the timing belt 32 as indicated by arrows A, and since the timing belt 32 is wound around the timing belt pulleys 28a and 30a, the sections of the other run of the timing belt 32 on the opposite sides of an axis C passing the contact point of the tensioner 36 and the timing belt 32 are pulled, respectively, in opposite directions, as indicated by arrows B. Accordingly, opposite torques are applied respectively to the pinions 28 and 30, as indicated by arrows P and Q, to press the respective teeth of the pinions 28 and 30 respectively in opposite directions against the meshing teeth of the driven gear 26, to thereby eliminate the backlash between the pinions 28 and 30 and the driven gear 26. When the tension in the timing belt 32 is properly adjusted by the tensioner 36, the backlash is adjusted to an optimum value so that the rotation of the drive pinions is transmitted to the drive gear without error, when reversing the rotating direction of the driven gear, and thus a precise gear transmission mechanism is formed.

Therefore, an appropriate backlash elimination is achieved by adjusting the tension in the timing belt 32 by the tensioner 36, to complete the assembly of the robot joint structure provided with the gear transmission mechanism and the belt transmission mechanism, and the above setting and adjusting processes.

In the robot joint structure thus constructed, the backlash is eliminated and the drive pinion 28 engaging the driven gear 26 is connected directly to the servomotor 34. Accordingly, the driven gear 26 is restrained from free rotation by the drive pinion 28, even if the timing belt 32 is broken due to fatigue, etc., while the rotative drive force is being transmitted through the belt transmission mechanism and the other pinion 30 to the driven gear 26, and thus the possibility of an uncontrolled motion of the movable robot element connected to the driven gear 26 is eliminated.

From the foregoing it will be understood that, according to the present invention, backlash between the teeth of the mating gears of a joint structure, particularly, a joint structure provided with a gear transmission mechanism, incorporated into a robot assembly and concerned with the accuracy of rotation transmission of the joint structure, is adjusted to an optimum value to thereby enable a precise rotation transmission, so that the joint structure ensures precise actions of the movable robot elements articulated by the joint structure, to thereby ensure precise robot actions by improving the accuracy of the positioning of an end effector provided at the extremity of the robot unit, and in the actions of the end effector. Compared with the conventional joint structure provided with two belt mechanisms, in the joint structure of the present invention there is no possibility that the driven gear of the rotative transmission system can be released and cause free or uncontrolled motions, even if the power transmission belt of the belt transmission mechanism is accidentally broken, because the pinion directly connected to the rotative drive source is in engagement with the driven gear. Thus, the present invention has provides a significant improvement of the safety of industrial robots.

What is claimed is:

1. A joint structure incorporated into an industrial robot to drive a movable robot element of the industrial robot through a gear transmission mechanism, the joint structure comprising:

a driven gear articulated to the movable robot element;

two drive pinions in mesh with said driven gear, respectively, at two different positions on said driven gear;

a belt transmission mechanism operatively connecting said two driving pinions;

an adjustable tensioner engaging the belt transmission mechanism to provide a tension adjustment to thereby cause said belt transmission mechanism to press respective teeth of said two drive pinions against teeth of said driven gear, respectively, in opposite directions, whereby backlash between the meshing teeth is eliminated; and a rotative drive source connected to one of said two drive pinions.

2. A joint structure according to claim 1, wherein said belt transmission mechanism comprises a drive timing belt pulley provided on a shaft connecting said rotative drive source and said drive pinion connected to said rotative drive source, a driven timing belt pulley mounted on a free end of the shaft of said other drive pinion; and a power transmission belt extended between said drive and driven timing belt pulleys.

3. A joint structure according to claim 2, wherein said tensioner comprises a rotary roller pressed against an outer side of said power transmission belt to thereby apply an adjustable pressure to said power transmission belt.

* * * * *